United States Patent [19]

Kamo

[11] Patent Number: 5,232,888
[45] Date of Patent: * Aug. 3, 1993

[54] METHOD OF PREPARING CATALYST FOR HYDROGENATION OF HYDROCARBON OIL

[75] Inventor: Tetsuro Kamo, Ichikawa, Japan

[73] Assignee: Sumitomo Metal Mining Co., Ltd., Tokyo, Japan

[*] Notice: The portion of the term of this patent subsequent to Apr. 6, 2010 has been disclaimed.

[21] Appl. No.: 774,340

[22] Filed: Oct. 10, 1991

[30] Foreign Application Priority Data

Oct. 17, 1990 [JP] Japan .................. 2-278056

[51] Int. Cl.$^5$ .............................. B01J 31/00
[52] U.S. Cl. .................... 502/170; 502/224; 502/313; 502/314; 502/315
[58] Field of Search ............. 502/170, 313, 314, 315, 502/224

[56] References Cited

U.S. PATENT DOCUMENTS 4,455,390  6/1984  Ting et al. ............... 502/204
4,879,265  11/1989  Simpson et al. .......... 502/211

Primary Examiner—Patrick P. Garvin
Assistant Examiner—Brent M. Peebles
Attorney, Agent, or Firm—Watson, Cole, Grindle & Watson

[57] ABSTRACT

Disclosed is a method of preparing a catalyst for hydrogenation of a hydrocarbon oil, in which a hydroxycarboxylic acid is added to a catalyst carrying a metal of the Group VI of the Periodic Table and a metal of the Group VIII of the same, optionally along with phosphoric acid, on a carrier, in an amount of from 0.3 to 5 molar times of the total metal molar number of the metal of the Group VI and the metal of Group VIII, and thereafter the resulting catalyst is dried at a temperature not higher than 200° C. The catalyst has a high catalyst activity and is used for hydrogenation of a hydrocarbon oil, especially satisfying the requirement of reducing the sulfur content in a light oil.

14 Claims, No Drawings

METHOD OF PREPARING CATALYST FOR HYDROGENATION OF HYDROCARBON OIL

FIELD OF THE INVENTION

The present invention relates to a method of preparing a highly active catalyst for hydrogenation of a hydrocarbon oil, which satisfies the requirement of reducing the sulfur content in a light oil.

BACKGROUND OF THE INVENTION

In the hydrogenation of a hydrocarbon oil in the presence of hydrogen for hydrogen addition, desulfurization, denitrogenation, decomposition or the like, a hydrogenating catalyst (hereinafter referred to as a "catalyst") composed of a catalyst carrier of a porous inorganic oxide, such as alumina, titania or silica, and active metal components of Group VI of the Periodic Table of Mo or W and Group VIII of the same of Ni or Co, as carried on the carrier, is used as a basic catalyst. In a catalyst of the type, in general, the above-mentioned active metals carried on the catalyst carrier are in the form of their oxides. Since such metal oxides are inactive as they are, the catalyst with such metal oxide cannot be applied to hydrogenation. Therefore, the metal oxides are necessarily activated by converting them into the corresponding metal sulfides. Under the situation, after the above-mentioned catalyst has been placed in a device for the hydrogenation of a hydrocarbon oil, an adequate pre-sulfurization treatment is indispensable, wherein the catalyst layer in the device is necessarily sulfurized by introducing a hydrocarbon oil containing a dissolved sulfurizing agent under heat. It is known that the active site of the thus-pre treated catalyst is formed on the surfaces of the resulting active metal sulfides, so that the total number of active sites will increase with an increase in the exposed surface area of the active metal sulfides, yielding a high catalyst activity. An increase in the exposed surface area of the active metal sulfides may be attained by enhanced dispersion of the active metal sulfides carried on the catalyst carrier or by minimization of the crystal size of the respective active metal sulfides. Methods of preparing a catalyst having fine crystals of active metal sulfides as finely dispersed and carried on a carrier have been disclosed. For instance, Japanese Patent Application Laid-Open Nos. 59-102442 and 59-69147 mention a series of methods of preparing a catalyst in which a catalyst carrier such as an alumina is dipped in an aqueous solution of active metals containing a carboxylic acid, such as citric acid or malic acid, as a complexing agent for active metals and thereafter it is fired. EP 0181035(A2) mentions a method of preparing a catalyst in which an organic compound having a nitrogen-containing ligand (e.g., amino group, cyano group) such as nitriloacetic acid, ethylenediaminetetraacetic acid or diethvlenetriamine is used as a complexing agent and is added to an aqueous solution of active metals, a catalyst carrier such an alumina or silica is dipped in the resulting aqueous solution of active metals, and the catalyst composed of active metals as carried on the catalyst carrier is then dried at a temperature of not higher than 200° C. without firing.

In accordance with the method of adding a carboxylic acid as a complexing agent followed by firing, the carboxylic acid added is effective for elevating the stability of the active metal-dipping solution as it acts as a complexing agent for active metals and additionally the acid is also effective for inhibiting coagulation of active metals. In the method, however, the active metals will finally coagulate because of the final firing step, so that the finally obtained catalyst by the method cannot have a sufficiently improved catalyst activity. The method is defective in this point. On the other hand, in accordance with the method as disclosed in EP 0181035(A2), since the active metal ions such as Mo or Ni ions are firmly coordinated with the nitrogen-containing compound, such ions are carried on the carrier in the form of a highly dispersed condition. In addition, since the catalyst with the carrier is not calcined but is merely dried at a low temperature of not higher than 200° C., the dispersion of the active metals is finally maintained as it is. Further, since the active metal ions are directly formed into sulfides thereof without forming oxides thereof by pre-sulfurization, the finally obtained catalyst may have an extremely highly dispersed state. For these reasons, the catalyst prepared by the method has a higher activity than any other conventional catalysts, but it still does not have a high enough hydrogenation and desulfurization activity to meet the recent demand of reducing the sulfur content in a light oil (precisely, to 0.05% by weight or less as the sulfur content in a light oil) for solving the problem resulting from the current legal controls on gaseous wastes. Additionally, since the catalyst contains a nitrogen-containing organic compound such as nitriloacetic acid or the like, there is a problem that the organic compound would be decomposed in the pre-sulfurization step to generate a toxic gas such as hydrogen cyanide.

SUMMARY OF THE INVENTION

The object of the present invention is to provide a method of preparing a highly active catalyst which may satisfy the above-mentioned requirement of reducing the sulfur content in a light oil.

The present inventor repeatedly studied for the purpose of solving the above-mentioned problems in the prior arts and of attaining the above-mentioned object and, as a result, has found that the object can be attained by adding a determined amount of a hydroxycarboxylic acid to a catalyst composed of base metals and optionally phosphoric acid as carried on a carr . ' followed by drying the resulting catalyst at a temperature not higher than 200° C. On the basis of the finding, the inventor has achieved the present invention.

Specifically, in accordance with a first embodiment of the present invention, there is provided a method of preparing a catalyst for hydrogenation of a hydrocarbon oil in which a hydroxycarboxylic acid is added to a catalyst carrying a metal of Group VI of the Periodic Table and a metal of Group VIII of the same on a carrier in an amount of from 0.3 to 5 molar times of the total metal molar number of metal of the Group VI and the metal of Group VIII, and thereafter the resulting catalyst is dried at a temperature not higher than 200° C.

In accordance with a second embodiment of the present invention, there is provided a method of preparing a catalyst for hydrogenation of a hydrocarbon oil in which a hydroxycarboxylic acid is added to a catalyst carrying a metal of Group VI of the Periodic Table and a metal of Group VIII of the same along with phosphoric acid on a carrier in an amount of from 0.3 to 5 molar times of the total metal molar number of metal of the Group VI and the metal of Group VIII, and thereafter the resulting catalyst is dried at a temperature not higher than 200° C.

DETAILED DESCRIPTION OF THE INVENTION

In the present invention, at least one selected from ordinary porous substances, such as alumina, silica, titania, zirconia, active charcoal and the like, is used as a catalyst carrier substance in a conventional manner.

As the metal of Group VI of the Periodic Table, at least one of Mo and W is used; and as metal of the Group VIII of the same, at least one of Co and Ni is used.

As examples of a hydroxycarboxylic acid usable as a complexing agent in the present invention, there are mentioned, for example, glycolic acid, hydroxypropionic acid, hydroxybutyric acid, hydroxyhexanoic acid, tartaric acid, malic acid, glyceric acid, citric acid, gluconic acid, etc.

As phosphoric acid, anyone of metaphosphoric acid, pyrophosphoric acid, orthophosphoric acid, triphosphoric acid and tetraphosphoric acid can be used. A soluble salt of the acid such as nickel phosphate may also be used.

Amount of the metal of Mo or W of the Group VI of the Periodic Table to be carried on the carrier is desirably from 5 to 30% by weight as its oxide. The amount of the metal of Ni or Co of Group VIII of the same to be carried on the carrier is desirably from 1 to 8% by weight as its oxide. If the amounts of such active metals to be carried on the carrier are less than those falling within the above-mentioned ranges, a highly active catalyst cannot be obtained by the method of the present invention. On the other hand, if they are more than those falling within the above mentioned ranges, the pores of the carrier will be clogged with the active metals so that internal diffusion of a hydrocarbon oil in the catalyst will be inhibited and the activity of the catalyst will be poor.

Phosphoric acid is desired to be added to the catalyst in an amount of from 0.1 to 8% by weight as $P_2O_5$, whereby the activity of the catalyst is elevated further.

The hydroxycarboxylic acid is added to the catalyst having metals of Group VI and Group VIII of the Periodic Table as carried on a carrier or to the catalyst having the metals along with phosphoric acid as carried on a carrier, and the amount of the hydroxycarboxylic acid to be added is from 0.3 to 5 molar times of the total molar number of the metals of Group VI and Group VIII. If the amount of the acid added is less than 0.3 molar times, it will be insufficient for coordinating and complexing the active metals. If, however, the amount of the acid added is more than 5 molar times, a carbonaceous material will remain or precipitate in the catalyst to inhibit sulfurization of the active metals. Anyway, both are disadvantageous as lowering the catalyst activity.

The drying temperatures for drying the catalyst is not higher than 200° C. In this regard, if the temperature is higher than 200° C., the added complexing agent will disadvantageously decompose.

The catalyst of the present invention thus prepared under the above-mentioned conditions is in the form of a coordination compound composed of the active metal ions of Mo, W, Ni and/or Co ions and the added hydroxycarboxylic acid. The coordination compound is stabilized and carried on the catalyst carrier. Though not clear, the reason why the activity of the catalyst as obtained by the use of a hydroxycarboxylic acid as a complexing agent is much higher than any other conventional catalyst as prepared by the use of a nitrogen-containing compound such as nitriloacetic acid, ethylenediaminetetraacetic acid or diethylenetriamine as a complexing agent could be considered because the decomposition behavior of the respective complexing agents would have some relation to the decomposing property of active metal sulfides since hydroxycarboxylic acids and nitrogen-containing organic compounds differ from each other in the decomposition behaviors thereof.

The present invention will now be explained in more detail by way of the following examples, which, however, are not intended to restrict the scope of the present invention.

EXAMPLE 1

800 ml of an aqueous solution of active metals, as prepared from 193 g of molybdenum trioxide, 82 g of cobalt carbonate, 61.5 g of 85% phosphoric acid and water, was infiltrated into one kg of γ-alumina carrier having a specific surface area of 280 $m^2/g$ and a pore capacity of 0.75 ml/g, and the thus infiltrated γ-alumina carrier was dried at 110° C. for 5 hours. Next, 152.1 g of glyceric acid was infiltrated into 250 g of the dried product, which was then further dried at 110° C. for 10 hours to obtain a catalyst sample (Catalyst-A). Regarding the active metal contents in Catalyst-A, Mo content therein was 15% by weight as MoO, Co content therein was 4% by weight as CoO, and P content therein was 3% by weight as $P_2O_5$. The amount of the glyceric acid added was 2.5 molar times of the total molar number of Mo and Co. As an activity test of Catalyst-A thus obtained, a Kuwait normal pressure light oil having the following properties was subjected to hydrogenation and desulfurization with Catalyst-A.

| | |
|---|---|
| Specific gravity (15/4° C.) | 0.844 |
| Sulfur content (wt %) | 1.55 |
| Distillation property | |
| Initial distillation point (°C.) | 231 |
| 50 vol. % point (°C.) | 313 |
| Final point (°C.) | 390 |

The reaction was effected under the conditions mentioned below, using a flow reactor system.

| | |
|---|---|
| Amount of catalyst (ml) | 15 |
| Liquid space velocity of crude oil ($hr^{-1}$) | 2 |
| Hydrogen pressure for reaction ($kg/cm^2G$) | 30 |
| Reaction temperature (°C.) | 330 |
| Ratio of hydrogen/oil flow (N l/l) | 300 |
| Oil flow period (hr) | 88 |

A rate constant of the catalyst sample (Catalyst-A) is calculated out as the desulfurization rate is considered to be proportional to the 1.75th power of the sulfur content in the oil after the treatment, and a relative rate constant of Catalyst-A is obtained on the basis of Catalyst-Q (Comparative Example 4 which will be mentioned below) having a standard rate constant of 100. It is shown in the Table mentioned below along with the desulfurization percentage (%) of the crude oil with Catalyst-A.

EXAMPLES 2 TO 5

Catalysts-B, C, D and E were prepared in the same manner as in Example 1, except that 101.3 g of glycolic acid (Example 2), 94.8 g of lactic acid (Example 3), 99.0 g of α-hydroxybutyric acid (Example 4) and 125.5 g of α-hydroxyhexanoic acid (Example 5) were used, respectively, as a complexing agent Regarding the active metal contents in these catalysts, Mo content was 15% by weight as $MoO_3$, Co content was 4% by weight as CoO and P content was 3% by weight as $P_2O_5$. The amount of the complexing agent in these catalysts was 2.5 molar times of the total molar number of Mo and Co. The activity test of these catalysts was effected in the same manner as in Example 1, and the results obtained are shown in the Table below

EXAMPLES 6 TO 8

400 ml of an aqueous solution of active metals, as prepared from 96.2 g of molybdenum trioxide, 41 g of cobalt carbonate, 30.8 g of 85% phosphoric acid and water, was infiltrated into 500 g of the above-mentioned γ-alumina carrier, which was then dried at 110° C. Next, 56.0 g of tartaric acid (Example 6), 50.5 g of malic acid (Example 7) or 132.6 g of gluconic acid (Example 8) was infiltrated into 200 g of the dried product, which was dried at 110° C for 10 hours. Accordingly, Catalyst F, G and H were obtained, respectively. Regarding the active metal contents in these catalysts, Mo content was 15% by weight as MoO, Co content was 4% by weight as CoO and P content was 3% by weight as $P_2O_5$. The amount of the tartaric acid or malic acid added was 1.25 molar times of the total molar number of Mo and Co; and that of the gluconic acid added was 1.1 molar times of the same. The activity test of these catalysts was effected in the same manner as in Example 1, and the results obtained are shown in the Table below.

EXAMPLE 9

160 ml of an aqueous solution of active metals, as prepared from 38.5 g of molybdenum trioxide, 16.4 g of cobalt carbonate, 12.3 g of 85% phosphoric acid and water, was infiltrated into 200 g of the above-mentioned γ-alumina carrier, which was then dried at 110° C. for 5 hours. Next, 67.0 g of citric acid was infiltrated into the dried product, which was again dried at 110° C. for 10 hours. Thus, a catalyst sample (Catalyst-I) was obtained. Regarding the active metal contents in Catalyst-I, Mo content was 15% by weight as $MoO_3$ and Co content was 4% by weight as CoO. The amount of the citric acid added was 0.8 molar time of the total molar number of Mo and Co. The activity test of the catalyst was effected in the same manner as in Example 1, and the results obtained are shown in the Table below.

EXAMPLE 10

160 ml of an aqueous solution of active metals, as prepared from 38.5 g of molybdenum trioxide, 16.4 g of cobalt carbonate, 12.3 g of 85% phosphoric acid, 67.0 g of citric acid and water, was infiltrated into 200 g of the above-mentioned γ-alumina carrier, which was then dried at 110° C. for 5 hours. Thus, a catalyst sample (Catalyst-J) was obtained. Regarding the active metal contents in Catalyst-J, Mo content was 15% by weight as $MoO_3$, Co content was 4% by weight as CoO and P content was 3% by weight as $P_2O_5$. The amount of the citric acid added was 0.8 molar time of the total molar number of Mo and Co. The activity test of the catalyst was effected in the same manner as in Example 1, and the results obtained are shown in the Table below.

EXAMPLES 11 AND 12

150 ml of an aqueous solution of active metals, as prepared from 35.7 g of molybdenum trioxide, 15.23 g of cobalt carbonate, 11.4% of phosphoric acid and water, was infiltrated into 200 g of pseudo-boehmite alumina carrier ($Al_2O_3$ content: 92.8 wt. %), which was then dried at 110° C. for 5 hours. 22.4 g of tartaric acid (Example 11) or 25.2 g of malic acid (Example 12) was infiltrated into 100 g of the dried product, which was again dried at 110° C. for 10 hours. Accordingly, Catalyst-K and L were obtained. Regarding the active metal contents in these catalyst samples, Mo content was 15% by weight as $MoO_3$, Co content was 4% by weight as CoO and P content was 3% by weight as $P_2O_5$. The amount of the tartaric acid or malic acid added was 1.25 molar times of the total molar number of Mo and Co. The activity test of these catalyst samples was effected in the same manner as in Example 1, and the results obtained are shown in the Table below.

EXAMPLE 13

160 ml of an aqueous solution of active metals, as prepared from 38.5 g of molybdenum trioxide, 16.2 g of nickel carbonate, 12.3 g of 85% phosphoric acid and water, was infiltrated into 200 g of the above-mentioned γ-alumina carrier, which was then dried at 110° C. for 5 hours. Next, 67.0 g of citric acid was infiltrated into the dried product, which was again dried at 110° C. for 10 hours. Thus, a catalyst sample (Catalyst-M) was obtained. Regarding the active metal contents in Catalyst-M, Mo content was 15% by weight as $MoO_3$, Ni content was 4% by weight as NiO, and P content was 3% by weight as $P_2O_5$. The amount of the citric acid added was 0.8 molar time of the total molar number of Mo and Ni. The activity test of the catalyst was effected in the same manner as in Example 1, and the results obtained are shown in the Table below.

COMPARATIVE EXAMPLES 1 TO 4

800 ml of an aqueous solution of active metals, as prepared from 193 g of molybdenum trioxide, 82 g of cobalt carbonate, 61.5 g of 85% phosphoric acid and water, was infiltrated into 1 kg of the same γ-alumina carrier as that used in the previous examples. The thus infiltrated γ-alumina carrier was then dried at 110° C. for 5 hours. As a complexing agent, 69.7 g of EDTA (Comparative Example 1), 59.3 g of nitrilotriacetic acid (Comparative Example 2), 96.2 g of diethylenetriamine (Comparative Example 3) or 57.2 g of ethylenediamine (Comparative Example 4) was infiltrated into 250 g of the dried product, which was again dried at 110° C. Accordingly, catalyst samples (Catalysts-N, O, P and Q) were prepared. Regarding the active metal contents in these catalyst samples, Mo content was 15% by weight as $MoO_3$, Co content was 4% by weight as CoO and P content was 3% by weight as $P_2O_5$. The complexing agent added was 0.6 molar time (as EDTA), 0.8 molar time (as nitrilotriacetic acid) or 2.5 molar times (as diethylenetriamine or ethylenetriamine), respectively, of the total molar number of Mo and Co. The activity test of these catalysts was effected in the same manner as in Example 1, and the results obtained are shown in the Table below.

| Example No. | Catalyst | Desulfurization Percentage (%) | Relative Rate Constant |
| --- | --- | --- | --- |
| Example 1 | A | 97.2 | 308 |
| Example 2 | B | 95.7 | 217 |
| Example 3 | C | 96.2 | 240 |
| Example 4 | D | 95.8 | 221 |
| Example 5 | E | 94.8 | 185 |
| Example 6 | F | 95.4 | 205 |
| Example 7 | G | 96.7 | 284 |
| Example 8 | H | 95.1 | 194 |
| Example 9 | I | 96.0 | 230 |
| Example 10 | J | 95.3 | 201 |
| Example 11 | K | 95.0 | 191 |
| Example 12 | L | 95.6 | 213 |
| Example 13 | M | 96.2 | 240 |
| Comparative Example 1 | N | 92.3 | 132 |
| Comparative Example 2 | O | 92.7 | 138 |
| Comparative Example 3 | P | 91.5 | 121 |
| Comparative Example 4 | Q | 89.5 | 100 |

In accordance with the present invention, there is provided a method of preparing a catalyst for hydrogenation of a crude hydrocarbon oil, in which a determined amount of hydroxycarboxylic acid is applied to a catalyst having metals of the Group VI and the Group VIII of the Periodic Table and optionally phosphoric acid as carried on a carrier and thereafter the catalyst is dried at a temperature not higher than 200° C. The catalyst of the invention is usable for high hydrogenation of a hydrocarbon oil for deep desulfurization or denitrogenation of the same. Therefore, the catalyst may sufficiently satisfy the requirement of reducing the sulfur content in a light oil as one advantageous merit. As another merit, the method of the present invention is free from presulfurization of generating any harmful and toxic gas, and the catalyst as prepared by the method of the present invention may stably be carried on the carrier.

While the invention has been described in detail and with reference to specific embodiments thereof, it will be apparent to one skilled in the art that various changes and modifications can be made therein without departing from the spirit and scope thereof.

What is claimed is:

1. A method of preparing a catalyst for the hydrogenation of a hydrocarbon oil which consists of the steps of (a) providing a catalyst in the form of a carrier carrying a metal, of Group VI of the Periodic Table and a metal of Group VIII of the periodic Table in an amount of from 0.3 to 5 molar times of the total metal molar number of the Group VI metal and the Group VIII metal, (b) adding a hydroxycarboxylic acid to said catalyst, and (c) heating said catalyst with hydroxycarboxylic acid to a temperature of not higher than 200° C.

2. The method of preparing a catalyst for hydrogenation of a hydrocarbon oil as claimed in claim 1, wherein the metal of Group VI of the Periodic Table is at least one selected from the group consisting of Mo and W.

3. The method of preparing a catalyst for hydrogenation of a hydrocarbon oil as claimed in claim 1, wherein the metal of Group VIII of the Periodic Table is at least one selected from the group consisting of Co. an Ni.

4. The method of preparing a catalyst for hydrogenation of a hydrocarbon oil as claimed in claim 1, wherein the hydroxycarboxylic acid is selected from the group consisting of glycolic acid, hydroxypropionic acid, hydroxybutyric acid, hydroxyhexanoic acid, tartaric acid, malic acid, glyceric acid, citric acid and gluconic acid.

5. The method of preparing a catalyst for hydrogenation of a hydrocarbon oil as claimed in claim 1, wherein the amount of the metal of Group VI of the Periodic Table as carried on the carrier is from 5 to 30% by weight as its oxide.

6. The method of preparing a catalyst for hydrogenation of a hydrocarbon oil as claimed in claim 1, wherein the amount of the metal of Group VIII of the Periodic Table as carried on the carrier is from 1 to 8% by weight at its oxide.

7. A method of preparing a catalyst for the hydrogenation of a hydrocarbon oil which consists of the steps of (a) providing a catalyst in the form of a carrier carrying phosphoric acid and a metal of Group VI of the Periodic Table and a metal of Group VIII of the periodic Table in an amount of from 0.3 to 5 molar times of the total metal molar number of the Group VI metal and the Group VIII metal, (b) adding a hydroxycarboxylic acid to said catalyst, and (c) heating said catalyst with hydroxycarboxylic acid to a temperature of not higher than 200° C.

8. The method of preparing a catalyst for hydrogenation of a hydrocarbon oil as claimed in claim 7, wherein the metal of Group VI of the Periodic Table is at least one selected from the group consisting of Mo and W.

9. The method of preparing a catalyst for hydrogenation of a hydrocarbon oil as claimed in claim 7, wherein the metal of Group VIII of the Periodic Table is at lest one selected from the group consisting of Co and Ni.

10. The method of preparing a catalyst for hydrogenation of a hydrocarbon oil as claimed in claim 7, wherein the hydroxycarboxylic acid is selected from the group consisting of glycolic acid, hydroxypropionic acid, hydroxybutyric acid, hydroxyhexanoic acid, tartaric acid, malic acid, glyceric acid, citric acid and gluconic acid.

11. The method of preparing a catalyst for hydrogenation of a hydrocarbon oil as claimed in claim 7, wherein the amount of the metal of Group VI of the Periodic Table as carried on the carrier is from 5 to 30% $ by weight as its oxide.

12. The method of preparing a catalyst for hydrogenation of a hydrocarbon oil as claimed in claim 7, wherein the amount of the metal of Group VIII of the Periodic Table as carried on the carrier is from 1 to 8% by weight as its oxide.

13. The method of preparing a catalyst for hydrogenation of a hydrocarbon oil as claimed in claim 7, wherein the phosphoric acid is selected from the group consisting of metal-phosphoric acid, pyro-phosphoric acid, orthophosphoric acid, tri-phosphoric acid, tetraphosphoric acid and nickel phosphate.

14. The method of preparing a catalyst for hydrogenation of a hydrocarbon oil as claimed in claim 7, wherein the amount of the phosphoric acid in the catalyst is from 0.1 to 8% by weight as $P_2O_5$.

* * * * *